US010922687B2

(12) United States Patent
Mahaffey et al.

(10) Patent No.: US 10,922,687 B2
(45) Date of Patent: Feb. 16, 2021

(54) CONSUMER DISCOUNT PAYMENT CARD SYSTEM AND METHOD

(71) Applicants: Robert G. Mahaffey, Las Vegas, NV (US); Rulx Ganthier, Jr., Lake Placid, FL (US)

(72) Inventors: Robert G. Mahaffey, Las Vegas, NV (US); Rulx Ganthier, Jr., Lake Placid, FL (US)

( * ) Notice: Subject to any disclaimer, the term of this patent is extended or adjusted under 35 U.S.C. 154(b) by 0 days.

(21) Appl. No.: 16/741,695

(22) Filed: Jan. 13, 2020

(65) Prior Publication Data

US 2020/0167768 A1 May 28, 2020

Related U.S. Application Data

(63) Continuation-in-part of application No. 15/718,537, filed on Sep. 28, 2017, now abandoned, which is a continuation-in-part of application No. 15/071,824, filed on Mar. 16, 2016, now abandoned, which is a
(Continued)

(51) Int. Cl.
*G06Q 20/38* (2012.01)
*G06Q 30/04* (2012.01)
*G06Q 20/34* (2012.01)
*G06Q 30/02* (2012.01)
*G06Q 20/40* (2012.01)
*G06Q 40/02* (2012.01)

(52) U.S. Cl.
CPC .......... *G06Q 20/387* (2013.01); *G06Q 20/34* (2013.01); *G06Q 20/4016* (2013.01); *G06Q 30/0213* (2013.01); *G06Q 30/0236* (2013.01); *G06Q 30/04* (2013.01); *G06Q 40/02* (2013.01)

(58) Field of Classification Search
CPC .. G06Q 20/387; G06Q 20/34; G06Q 20/4016; G06Q 30/0213; G06Q 30/0236; G06Q 30/04; G06Q 40/02; G06Q 20/24; G06Q 20/102; G06Q 30/0207; G06Q 40/025; G06F 19/328
USPC ........................................................ 705/2–3
See application file for complete search history.

(56) References Cited

U.S. PATENT DOCUMENTS

| | | | |
|---|---|---|---|
| 6,208,973 B1 * | 3/2001 | Boyer .................... | G06Q 40/08 705/2 |
| 2003/0195773 A1 * | 10/2003 | Mahaffey ............... | G06Q 30/04 705/3 |

OTHER PUBLICATIONS

C. D. Anderson, J. A. Fadul, A. Menon and H. D. Terceros, "Rx-decision: A decision support tool for the optimal prescription drug plan for patients," 2012 IEEE Systems and Information Engineering Design Symposium, Charlottesville, VA, 2012, pp. 24-29, doi: 10.1109/SIEDS.2012.6215124. (Year: 2012).*
(Continued)

*Primary Examiner* — Joy Chng
(74) *Attorney, Agent, or Firm* — Glenn E. Gold, P.A.; Glenn E. Gold

(57) ABSTRACT

An automated method of employing a dynamic discount card payment program to enable a discount card-carrying consumer to pay a discount card-accepting service provider bill amount, such that a dynamic discount payment card computer system monitors modifications made, by a service provider, to a discount rate methodology and automatically calculates and applies the service provider-modified discount rate methodology to the service provider bill amount during processing of a corresponding consumer discount card-based payment of the provider bill amount.

14 Claims, 14 Drawing Sheets

Related U.S. Application Data continuation of application No. 14/045,144, filed on Oct. 3, 2013, now abandoned.

(60) Provisional application No. 61/709,226, filed on Oct. 3, 2012, provisional application No. 62/134,741, filed on Mar. 18, 2015.

(56) References Cited

OTHER PUBLICATIONS

T. Hausken and P. Bruening, "Hidden costs and benefits of government card technologies," in IEEE Technology and Society Magazine, vol. 13, No. 2, pp. 24-32, Summer 1994, doi: 10.1109/44.286629. (Year: 1994).*

* cited by examiner

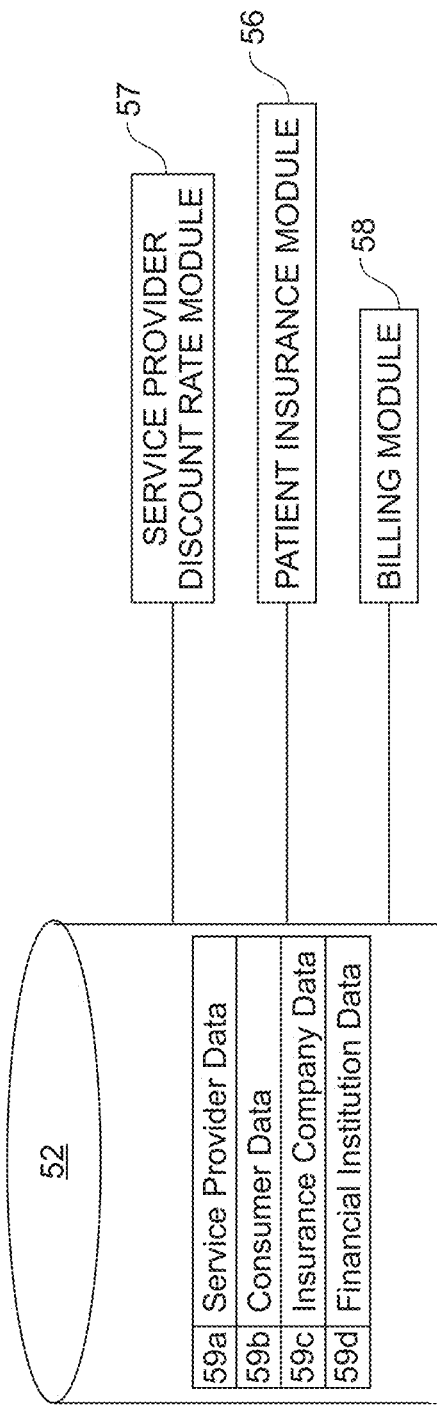
FIG. 3
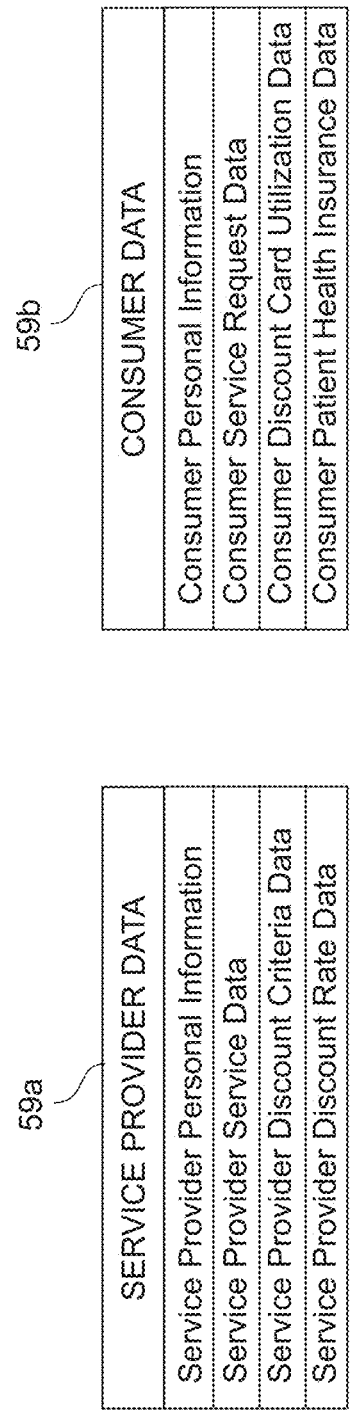
FIG. 5
FIG. 4

59c

| INSURANCE COMPANY DATA |
|---|
| Patient Insurance Deductible Data |
| Patient Insurance Claim Coverage Data |
| Service Provider Insurance Plan Data |

| FINANCIAL INSTITUTION DATA |
|---|
| Service Provider Bank Account Data |
| Consumer Bank Account Data |
| Discount Card System Bank Account Data |

FIG. 7

SERVICE PROVIDER GRAPHIC USER INTERFACE    16

Set Discount Rate Variables (Discount Rate Criteria)    16c

Fixed Discount %: ☐    17c

Date Range: ☐ to ☐    Discount %: ☐ [Add]
Date Range: ☐ to ☐    Discount %: ☐

Card Times Used: ☐ to ☐    Discount %: ☐ [Add]

Card Billing: $☐ to $☐    Date Range ☐ to ☐

Discount %: ☐ [Add]

Insurance Based:    In Network:    Discount %: ☐ [Add]

Out of Network:    Discount %: ☐

FIG. 10a

SERVICE PROVIDER GRAPHIC USER INTERFACE    16

Set Discount Rate Variables (Combination / Score Based)    16d

Date Range: ☐ to ☐    Points (0-10): ☐ [Add]
Date Range: ☐ to ☐    Points (0-10): ☐
Card Times Used: ☐ to ☐    Points (0-10): ☐ [Add]
Card YTD Billing: $☐ to $☐    Points (0-10): ☐ [Add]
In Network Insurance    17d    Points (0-10): ☐ [Add]
Out-of-Network Insurance    Points (0-10): ☐

Point-Based Rate: Total Points ☐ to ☐ [Add]
Discount % ☐

FIG. 10b

CONSUMER DISCOUNT PAYMENT CARD SYSTEM AND METHOD

CROSS-REFERENCE TO RELATED APPLICATIONS

This U.S. patent application is a continuation-in-part of co-pending U.S. patent application Ser. No. 15/718,537, filed Sep. 28, 2017, which is a continuation-in-part of U.S. patent application Ser. No. 15/071,824, filed on Mar. 16, 2016, which: (a) is a continuation-in-part of U.S. patent application Ser. No. 14/045,144, filed on Oct. 3, 2013, which claims priority to U.S. provisional patent application No. 61/709,226, filed on Oct. 3, 2012; and (b) claims the benefit of U.S. provisional patent application No. 62/134,741, filed Mar. 18, 2015. The entire content of each of the above-referenced U.S. patent applications is incorporated-by-reference herein.

FIELD OF THE INVENTION

The present invention relates generally to card-based systems and methods for discounting the cost of goods and services to consumers. More particularly, the invention pertains to a card-based discount system empowering providers of goods and services to control, in real time, criteria and variables used to determine discount rates to be applied to consumer billing.

BACKGROUND OF THE INVENTION

Customer loyalty and discount cards and coupons have existed for a long time. With the advent of electronics and small storage devices, such as memory chips and magnetic strips, electronic versions of such cards have become increasingly popular. Typically, such cards provide consumers with a fixed discount rate applied to the billed goods/services, or a discount rate associated with consumer loyalty to a particular provider. However, conventional card-based discount systems offer no control—or very limited control—of such consumer discounts by the provider of the goods/services. Unfortunately, throughout both the industrial goods and services sectors external factors, such as the particular time of the calendar year, affect the discount rate that providers would prefer to offer to discount card-carrying consumers. For example, during various times of the year when there is a business slowdown, a provider may wish to temporarily increase a card discount rate in order to entice consumer purchases. Likewise, a provider may wish to temporarily reduce a card discount rate when the relative demand for provider goods/services increases. Furthermore, a multifaceted corporation offering a wide range of goods and/or services may prefer to offer varying discount rates to purchases of disparate products and services. Rather than having to offer consumers multiple discount cards, it would greatly benefit to such companies to have a discount card system that supports the use of a single consumer discount card—doubling as a payment card—to automatically apply varying discount rates to various categories of goods and services during card payment processing. It would be highly desirable to provide such a combined payment-discount card wherein an associated discount card support system dynamically updates discount rates associated with particular categories of a company's goods and services at the moment of purchase, based upon provider-defined discount rate variables remotely updatable by a provider in real time.

In some industries, there has been no implementation—or very limited implementation—of discount card type systems and methods. For example, generally speaking, the healthcare industry has not been considered to be very conducive to the implementation of such conventional discount card systems. In part, this is due to various complicating factors, such as consumer health insurance plans, affecting a health care service provider's bill. For instance, a physician may bill patients differently for the same service depending upon whether or not the physician has a contract with the patient's health insurance plan provider (i.e. whether the physician is in the patient's insurance plan network). For instance, an "in-network physician" will typically receive less money from a patient for a particular service than he will receive from another patient having an insurance provider with which the physician has not contracted (i.e. where the physician is deemed to be "out of network.") This payment disparity is due to the lower rates a patient's health insurance provider has contracted for with the physician. As a result, the physician, when providing services as an "out-of-network" physician, may want to offer the consumer a higher discount rate in order to keep the patient. Accordingly, with respect to the health care industry, the inability of service providers to independently modify a consumer card discount rate in real time, and the provider's lack of real time control over criteria and variables used to calculate a card discount rate, have further impeded any implementation of healthcare consumer discount payment cards.

Still, there remains a well-recognized need in the healthcare service industry for an implementable consumer discount card system and method, primarily due to the huge potential benefits it would offer to both health care service providers and consumer patients—particularly, a healthcare discount card integrated with a conventional credit card (or other payment card).

As healthcare costs continue to rise, and the provision of healthcare services and patient visits continue to increase, today's healthcare providers often retain significant accounts receivable for the services they provide. The time lag between provision of a healthcare service and reimbursement by the insurance carrier, as well as delays in receiving payments of amounts for which the patient is responsible, continue to strain the revenue stream of healthcare providers. The cost of administering and collecting these accounts receivable represents a considerable resource allocation for the provider. Also, the carrying costs generated by these receivables represent a sizable expense for the provider. All healthcare providers, including hospitals, physicians, laboratories, ambulatory surgery centers, diagnostic centers and clinics, are subject to these costs of doing business.

Typically, when a patient receives healthcare services, she is expected to pay any amount not covered by insurance at the time the services are rendered. The payment is generally provided in the form of a personal check drawn from the patient's bank account, a credit card, or a debit card. In the former case, the check can take several days to clear before the corresponding deposit is made into the provider's bank account. Credit card transactions are typically processed faster—and thus the deposit is credited to the provider's account earlier—than check payments. Currently, with regard to consumer use of conventional credit cards, the healthcare service provider processes the credit card payment, thereby notifying the credit card issuer that the patient has charged the amount due to the credit card. A few days thereafter, this amount is debited from the patient's personal account and the service provider's bank account is credited with the amount charged by the patient. The transaction is finally concluded when the patient pays the credit card issuer for the healthcare service.

However, today's health insurance policies have patients paying more of their medical costs. That, in turn, creates financial challenges for many health care service providers. Consider this statistic: 73% of physicians say it typically takes at least one month to collect payments from patients, with 12% of patients waiting more than three months to pay, according to the most recent Trends in Healthcare Payments from healthcare payments network InstaMed™. As a result, there has been a lot of debate amongst health care service providers with regard to keeping their patients' credit card information on file. While doing so can ensure patients pay their bills and that those payments come through promptly, many health care service providers stress that keeping credit card data on file come with risks. And many say the drawbacks aren't worth the benefits.

A consumer discount payment card could resolve many of the issues associated with conventional credit card payments. Consumers would be more apt to pay at the time services are rendered, since the processed card payment would result in an immediate discount off of the post-insurance service provider-issued bill. Service providers would greatly benefit from such a consumer discount card system, and corresponding method of use, enabling service providers to independently set and modify discount criteria and the weight of individual selected criterion in calculating discount rates to be applied to discount card-carrying consumers. Likewise, healthcare service consumers would greatly benefit from such a discount payment card system and method enabling them to automatically receive discounts on their health care service provider bills while processing a bill payment using the discount card. It would be of further benefit to the consumer to provide such a system and method incorporating an electronic smart device application through which the consumer could quickly and efficiently identify a list of participating health care service providers offering a consumer-requested service, along with comparative discount rate and service cost information prior to making an appointment.

Accordingly, there is a well-recognized, as of yet unmet, need in the art for a novel system and method, which overcomes the above-stated drawbacks, limitations and disadvantages associated with implementation of conventional discount card systems and methods in the healthcare industry and other goods/services provider industries.

SUMMARY OF THE INVENTION

In embodiments of the invention, an automated method of employing a dynamic discount card payment program enables a discount card-carrying consumer to pay a discount card-accepting service provider bill amount, such that a dynamic discount payment card computer system automatically calculates and applies a current service provider established discount rate methodology to the service provider bill amount, in real time, during processing of a corresponding consumer discount card-based payment of the provider bill amount. The method generally includes steps of:

(a) maintaining, by a computer system including at least one computer, a database stored in a memory, including:
(1) electronic service provider data associated with services offered by a plurality of discount card-accepting service providers;

(2) consumer discount card use data related to consumer use of a corresponding consumer discount payment card during payment of prior service provider bills;

(3) electronic service provider discount rate criteria and associated discount rate data associated with service provider discounts offered to the discount card-carrying consumer, wherein the offered service provider discounts are automatically calculated by the discount payment card system computer based upon at least one discount rate variable controlled by said service provider;

(b) establishing, by the discount payment card system computer, a discount rate to be applied by, by the system computer, to the service provider bill amount;

(c) monitoring, by the system computer, in real time, for service provider updates to a service provider-defined discount rate methodology, and adjusting the established discount rate upon discovering a service provider update;

(d) applying, by the system computer, the adjusted discount rate to the service provider bill to calculate a discounted bill amount;

(e) calculating, by the system computer, a discount payment card system operator assumption-of-risk fee based upon a previously agreed-upon discount percentage of the provider-discounted bill amount; and (f) automatically processing, by the system computer, payment of the discounted bill amount, minus the assumption of risk fee, to the service provider.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which:

FIG. 3 is a schematic representation of a system database 52 and its content 59a-59d, and the associated system modules 56-58 relying on the database content, according to some embodiments of the invention;

FIG. 4 is a SERVICE PROVIDER DATA table 59a listing service provider-related database content, according to some embodiments of the invention;

FIG. 5 is a CONSUMER DATA table 59b listing consumer-related database content, according to some embodiments of the invention;

FIG. 6 is an INSURANCE COMPANY DATA table 59c listing general categories of consumer and service provider insurance-related data used by the system, according to some embodiments of the invention;

FIG. 7 is a FINANCIAL INSTITUTION DATA table 59d listing general categories of service provider, consumer, and system operator bank account data used by the system, according to some embodiments of the invention;

FIG. 10a is a schematic depiction of a graphical user interface (GUI) 16 of a service provider computer 14, providing a representation of a service provider screen 16c displaying a particular set of discount rate criteria 17c (and corresponding discount rates) to be established and maintained by the service provider, according to some embodiments of the invention;

FIG. 10b is a schematic depiction of a graphical user interface (GUI) 16 of a service provider computer 14, providing a representation of a service provider screen 16d displaying a particular set of discount rate criteria 17d (and corresponding points) to be established and maintained by the service provider, according to a score-based discount rate method enabling the service provider to incorporate a weighted combination of discount rate criteria, according to at least one embodiment of the invention;

Like reference numerals refer to like parts throughout the various views of the drawings.

DETAILED DESCRIPTION OF THE INVENTION

Figure 1:
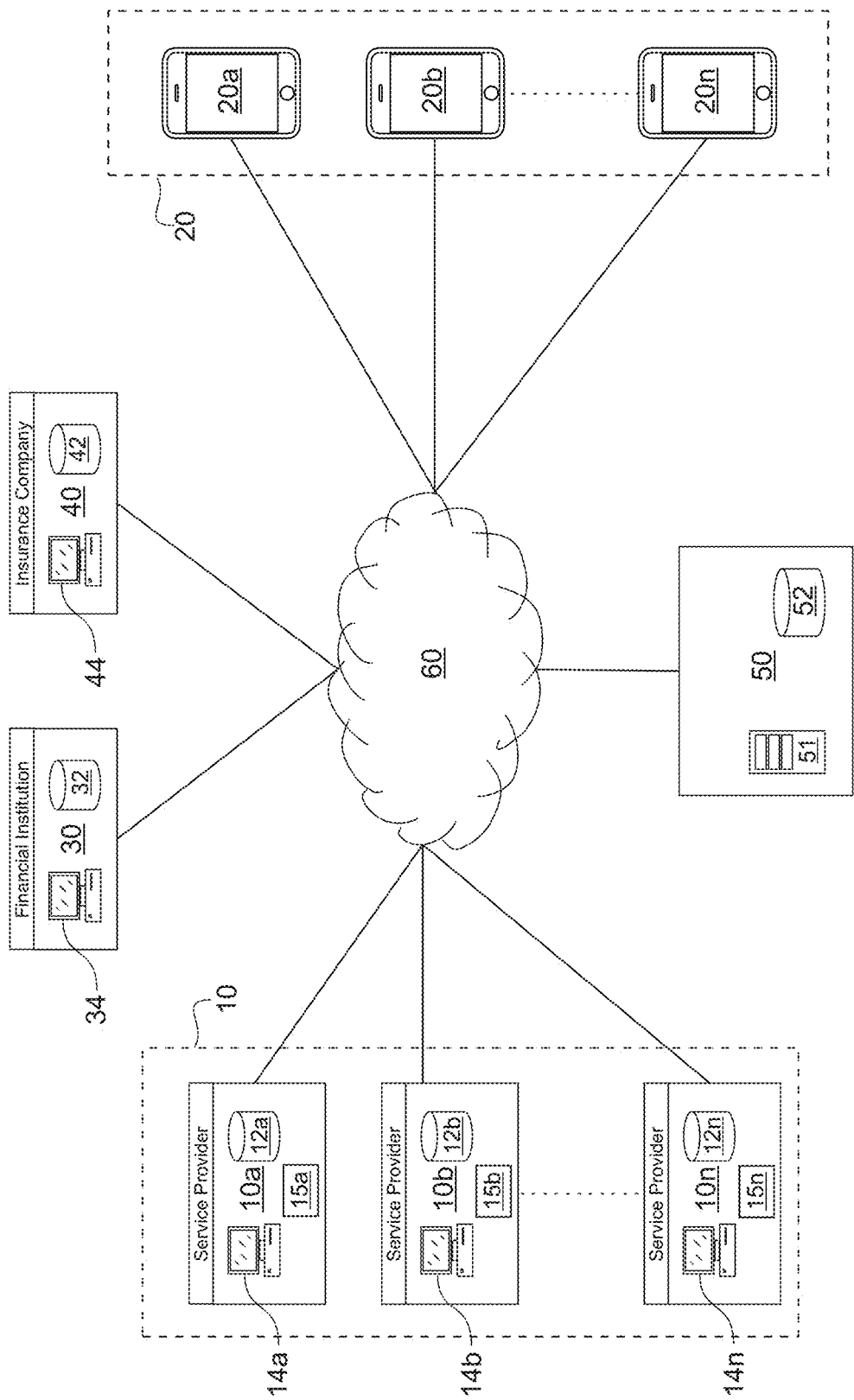
FIG. 1 is a schematic diagram illustrating the consumer discount payment card system of at least one embodiment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to implement the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the implementations/embodiments disclosed herein are not to be considered as limiting, unless the claims expressly state otherwise.

The implementations of the present invention reside primarily in a novel and non-obvious combination of elements and process steps. So as not to obscure the disclosure with details that will be readily apparent to those skilled in the art, certain conventional elements and steps have been presented with less detail, while the drawings and the specification describe in greater detail other elements and steps pertinent to understanding the embodiments. The presented embodiments are not intended to define limits as to the system, elements or methods of the inventions, but only to provide exemplary constructions. The embodiments are permissive rather than mandatory and are illustrative rather than exhaustive.

The present invention generally pertains to a system, method, and computer software application enabling the implementation of a consumer discount payment card program, whereby participating consumers may use an associated discount payment card (alternatively referred to herein as a "discount card," and a "payment card") to pay for goods and services offered by participating providers of the same. As used herein, the term "provider" may include a provider of goods, services, or both. The discount payment card program is described and illustrated primarily in connection with the provision of healthcare-related services; however, the invention is not intended to be so limiting. In fact, the healthcare services industry represents just potential industry in which the present invention may be implemented. As will be readily apparent to those skilled in the relevant art, the system, method and computer application described herein can be just as easily implemented within any of myriad goods-based or service-based industries in which the discount payment card program may be beneficial. Accordingly, with respect to the exemplary healthcare services implementation referenced herein, the terms "consumer," "patient," and "consumer-patient" may be used interchangeably to identify the purchaser of provided goods and/or services. Likewise, the terms "service provider," "health care service provider," and "physician" are used interchangeably throughout the specification.

Referring now generally to accompanying FIGS. 1-20, and primarily to FIGS. 1-7, in embodiments, the present invention may be implemented in the form of a discount payment card system 50 in communication—via a network 60 (e.g. the Internet)—with: (a) a plurality of participating service providers (10a-10n), represented generally by reference character 10; (b) a plurality of participating consumer-controlled portable smart devices (20a-20n), represented generally by reference character 20; (c) at least one financial institution 30; and (d) at least one insurance company 40.

Figure 2:
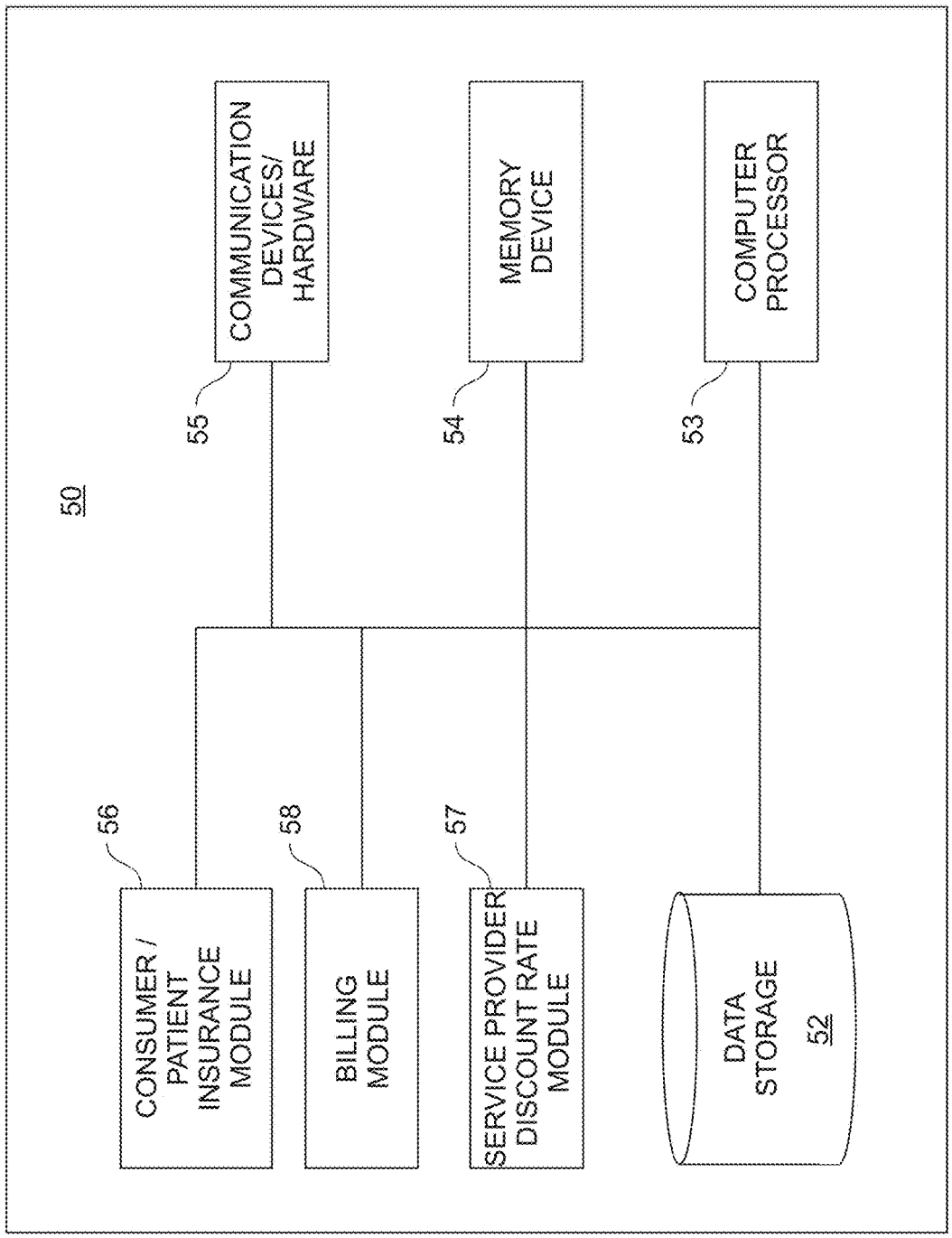
FIG. 2 is a block diagram of the discount payment card system and at least some of the components thereof as provided in accordance with at least one embodiment of the invention.
Figure 8:
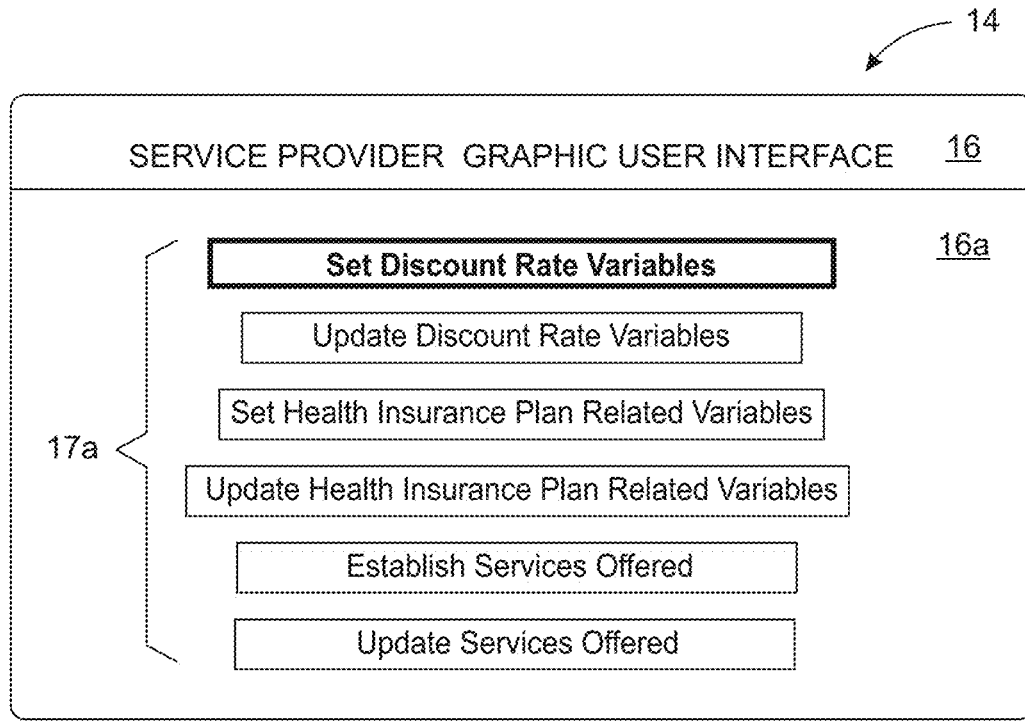
FIG. 8 is a schematic depiction of a graphical user interface (GUI) 16 of a service provider computer 14, providing a representation of a service provider screen 16a displaying general categories of information 17a established and maintained by the service provider, showing selection of the Set Discount Rate Variables icon, according to some embodiments of the invention.
Figure 9:
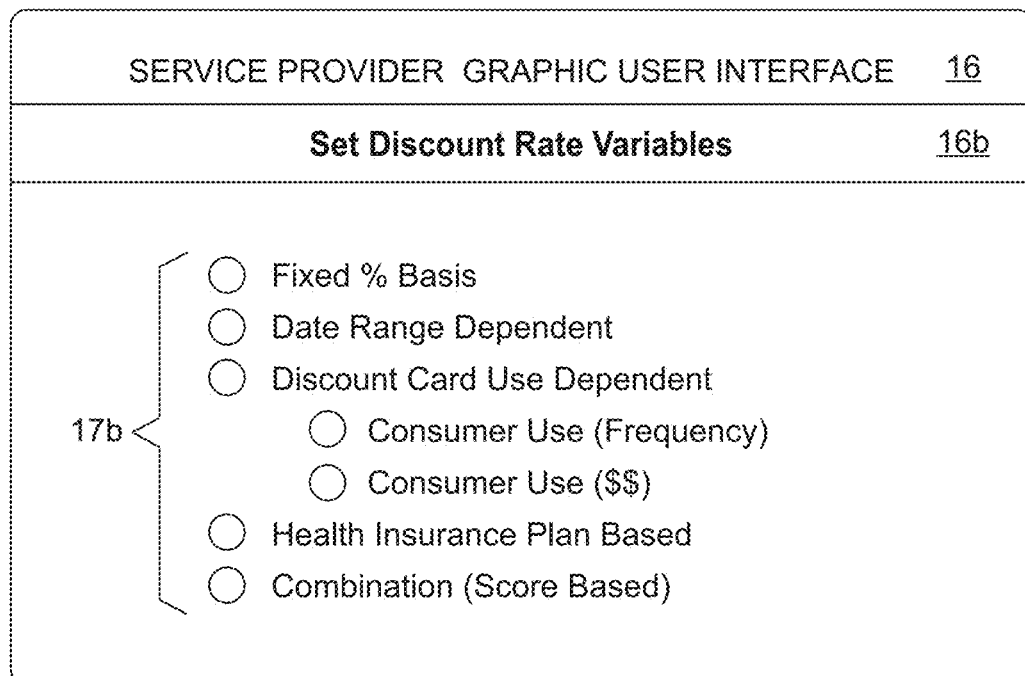
FIG. 9 is a schematic depiction of a graphical user interface (GUI) 16 of a service provider computer 14, providing a representation of a service provider screen 16b displaying a particular set of available discount rate variables for selection by the service provider, according to some embodiments of the invention.

Discount payment card system 50 may include at least one system computer 51 controlled by a system operator and communicative with one or more system database(s) 52. More specifically, as best shown in FIG. 2, system computer 51 preferably includes a computer processor 53, a memory device 54, a communication device 55, data storage 52, a consumer insurance module 56, a billing module 58, and a provider discount rate module 57. Although not shown in FIG. 2, additional system modules (e.g. a consumer and patient registration modules) may be provided. The term "module," as used herein, refers to a software module that is part of a software program composed of one or more independently developed modules that are not combined until the program is linked. A module typically consists of a single block of code that can be invoked in the way that a procedure, function, or method is invoked. A software module encapsulates code and data to implement a particular functionality, has an interface that enables access to its functionality in a uniform manner, is easily pluggable with another module that expects its interface, and is usually packaged in a single unit so that it can be easily deployed.

The computer processor 53 may include, for example, any device cooperatively structured to execute or implement computer instructions, software, etc. The data storage device 52, as used herein, may include one or more internal, external or removable hard disk drives, CD/DVD, USB drives, solid state drives, virtual drives, cloud-based storage devices, or other types of volatile and non-volatile memory. One or more relational databases may be implemented on or within storage device(s) of the present invention; for example, in order to store and retrieve various information corresponding to service provider data 59a, consumer data 59b, insurance company data 59c, and financial institution data 59d, as described herein. Further, the memory device 54 may include, but is not limited to, random access memory (RAM) or other like devices configured to implement the present invention in the intended manner; for example, by at least temporarily storing and assisting with the execution of one or more applications or computer programs capable of implementing the discount payment card system and methods described herein. Moreover, the communication device 55 may include a network communication hardware/software component or module structured to facilitate communication between the system computer 51 and service provider computers 14a-14n, consumer electronic devices 20, financial institution computer(s) 34, and insurance company computers 44 during implementation of the discount payment card methods of the present invention.

As best shown in FIG. 3, one or more system databases, represented generally by reference character 52, store service provider data 59a, consumer data 59b, insurance company data 59c, and financial institution data 59d.

As best shown in FIG. 4, service provider data 59a may include: (a) personal information pertaining participating service providers 10, such as participating service providers' contact information, physical locations, work schedules (including office hours), experience and the like; (b) service provider service data, including a comprehensive list of services offered; (c) service provider discount criteria data; and (d) service provider discount rate data.

As best shown in FIG. 5, consumer data 59b may include: (a) participating consumer personal information, such as participating consumers' contact information, physical locations, healthcare-related records and the like; (c) consumer discount card utilization data; and (d) consumer health insurance information and data, particularly where the present invention is deployed within a healthcare services environment.

As best shown in FIG. 6, insurance company data 59c may include: (a) patient-consumer insurance deductible data; (b) patient-consumer insurance claim coverage data; and (c) service provider-related insurance plan data.

As best shown in FIG. 7, financial institution data 59d may include: (a) service provider bank account data; (b) consumer bank account data; and (c) discount card system bank account data.

As described in more detail herein, participating service providers (10a-10n) may communicate with discount payment card system 50 via service provider computers (14a-14n) incorporating respective data storage devices (12a-12n), and service provider card payment-processing terminals (15a-15n). Communication between the service providers 10 and discount payment card system 50 is preferably facilitated over a wireless network 60, such as the Internet.

Participating consumers may communicate with discount payment card system 50 via respective consumer devices (20*a*-20*n*), such as conventional portable smartphone and tablet devices, having a system mobile software application installed and running thereon. Alternatively, the system mobile software application may reside on system computer 51 such that the application is accessible by the consumer devices. Communication between the consumer devices (20*a*-20*n*) and discount payment card system 50 is preferably facilitated over a wireless network 60, such as the Internet.

One or more financial institutions, represented generally by reference character 34, may be associated with bank accounts of participating consumers, participating providers, and a discount payment card system operator, in order to facilitate payment transactions associated with the processing of provider bills upon consumer payment via the discount payment cards (not shown) of the present invention. In a preferred embodiment, the discount payment cards have the form of a conventional credit card product that can be used to process provider payments using a conventional payment card processing terminal. Communication between the financial institution(s) and discount payment card system 50 is preferably facilitated over a wireless network 60, such as the Internet.

As will be apparent to those skilled in the relevant art, the "discount payment card" of the present invention may not be employed in the form of a physical payment card during consumer payment of a provider bill. Instead, the portable consumer devices 20 may be used to effect payments to the respective providers (via system 50) without utilizing the physical payment card 132. Known application software is available for a smart mobile electronic devices equipped with Near Field Communication (NFC) hardware (or any other available similar technology) to complete payments at NFC-equipped (or alternative technology equipped) terminals, such as payment card readers (15*a*-15*n*), by placing consumer electronic devices 20*a*-20*n* proximate to the payment card readers without requiring the use of the physical payment card, by merely incorporating the data from the payment card into the software application. In this manner, consumers can conduct payment transactions at provider locations 10*a*-10*n* without necessitating the carrying of the physical payment card. All references to use of a payment card herein are deemed to be inclusive of utilization of an NFC-equipped smart mobile electronic device incorporating information of the consumer discount payment card accounts associated with the payment cards.

Referring now particularly to FIGS. 8-15, participating providers 10*a*-10*n* interact, from provider computers 14*a*-14*n*, with system 50 via a service provider computer graphic user interface (GUI) 16. Initially, a potential participating provider may sign up to participate in the discount payment card program via a registration process wherein service provider data 59*a* is entered via GUI 16. Subsequent to inputting personal information as previously described, the potential provider is queried to provide information via a series of GUI screens 16*a*-16*i*.

In accordance with a first GUI screen 16*a*, the provider is queried by system 50 to enter system-required provider information via the GUI screens 16*a*-16*i* by selecting from a set of graphical icons 17*a*. Upon selecting a Set Discount Rate Variables icon (FIG. 8) a list of discount rate variables 17*b* (FIG. 9) are displayed on screen 16*b* to enable the provider to select one or more of the presented variables that the provider desires to use as a basis for computing, by system 50, consumer discounts to be applied to respective consumer bills for goods and/or services provided. In some embodiments, the discount rate variables 17*b* may include: (a) Fixed % Basis; (b) Date Range Dependent; (c) Discount Card Use Dependent; (d) Health Insurance Plan Based; and (e) Combination (Score Based). Furthermore, upon selecting Discount Card Use Dependent as a general basis, the provider is queried to further define whether billing discounts should be calculated based upon consumers' frequency of use of the discount payment card or, alternatively, based upon a consumer's total prior payments made to the provider using the discount payment card.

Referring now particularly to FIG. 10*a*, where a provider elects to have the system 50 use Fixed % Basis—either alone or in combination with Date Range Dependent—as a basis for consumer discount rate calculations, GUI screen 16*c* is presented. Via GUI screen 16*c*, the system 50 queries the provider to enter particular criteria to use, along with a corresponding provider-established discount rate, during computation of a discounted consumer bill. For instance, where the provider desires to simply employ a fixed discount rate (i.e. calculated as a percentage of the provider-billed amount) to provider bills, the provider may simply enter a desired discount rate in the corresponding Fixed Discount % box. Where the provider desires to employ variable discount rates to be applied, where the discount rate is dependent upon the particular date, for instance, a service has been provided the provider is queried to establish at least two date ranges and the corresponding discount rates. As shown, the provider may select the "Add" icon in order to select additional date ranges and associated discount rates. Where the provider desires to employ variable discount rates dependent upon the number of times that the consumer has previously used the discount payment card, during a provider-established time frame, as a means of payment for provider goods/services the provider is queried to input one or more card utilization ranges and the corresponding provider-defined discount rates to be applied to a consumer bill. In that regard, the provider is queried to input the provider-established time frame in a corresponding pair of date range boxes specifically associated with the card utilization bases. Where the provider desires to employ variable discount rates dependent upon total prior card billing during a provider-established time frame, the provider is queried to input one or more total card billed amount ranges, the corresponding date ranges, and the corresponding discount rates to be applied. Where the provider desires to employ specific discount rates dependent upon consumer insurance data—such as where discount rates are dependent upon whether a service is being rendered to a consumer by a health care service provider in the capacity of an in-network provider versus an out-of-network provider—the provider may simply enter a first fixed discount rate to be applied for in-network services, and a second fixed discount rate to be applied for out-of-network services.

Referring now particularly to FIG. 10*b*, in some embodiments, a provider may elect to employ a combination of weighted discount rate variables to be employed by the system 50 when calculating a consumer discount payment card rate to be applied to a consumer bill. Using the healthcare service industry theme as an example, where a provider elects to have the system 50 use Set Discount Rate Variables (Combination/Score Based) as a basis for consumer discount rate calculations, GUI screen 16*d* is presented. In this exemplary implementation, the system generates a total point-based score to be used in determining a particular discount rate to be applied to a consumer bill.

Via GUI screen 16*d,* the system 50 queries the provider to enter particular criteria 17*d* to use, along with corresponding provider-defined points to be applied to the total point-based score depending upon the provider-established criteria. Subsequently, the total point-based score is correlated to a discount rate using a provider-defined discount rate scoring system. For instance, where the provider desires to have the date that a service is performed factored into a consumer bill discount rate calculation, the service provider may enter one or more date ranges in the Date Range boxes, and corresponding points in the respective Points (0-10) boxes. Where the provider further desires to have the card utilization (based upon previous times used) factored into the consumer bill discount rate calculation, the service provider may enter one or more card usage ranges into the Card Times Used boxes, and corresponding points in the respective Points (0-10) boxes. Similarly, where the provider desires to have the card utilization (based upon previous billing processed using the discount payment card) factored into the consumer bill discount rate calculation, the service provider may enter one or more car usage ranges into the Card YTD Billing boxes, and corresponding points in the respective Points (0-10) boxes. Where the provider further desires to have her status as an in-network or out-of-network provider of a service factored into the consumer bill discount rate calculation, the service provider may select corresponding points to be applied in the In Network Insurance Points (0-10) boxes, along with corresponding points to be applied in the Out-of-Network Insurance Points (0-10) boxes. Finally, the provider is queried to establish applicable discount rates based upon total point ranges.

The following example is provided to illustrate an implementation of the exemplary score-based discount rate method. Let's assume that a provider enters the following criteria data into the Set Discount Rate Variables (Combination/Score Based) screen 16*d:*

TABLE 1

Sample Discount Provider Data

| Date Range: | Jan. 01, 2019 to Jun. 30, 2019 | Points (0-10): | 05 |
|---|---|---|---|
| Date Range: | Jul. 01, 2019 to Dec. 31, 2019 | Points (0-10): | 02 |
| Card Times Used: | 01 to 99 | Points (0-10): | 05 |
| Card YTD Billing: | $0.00 to $500.00 | Points (0-10): | 00 |
| Card YTD Billing: | $500.01 to $1,000.00 | Points (0-10): | 02 |
| Card YTD Billing: | $1,000.99 to $10,000.00 | Points (0-10): | 05 |
| Card YTD Billing: | $10,000.01 to $100,000.00 | Points (0-10): | 10 |
| In-Network: | | Points (0-10): | 00 |
| Out-of-Network: | | Points (0-10): | 05 |

TABLE 2

Points versus Discount Rates

| Point-Based Rate: | Total Points 00 to 05 | Discount %: | 02 |
|---|---|---|---|
| Point-Based Rate: | Total Points 06 to 08 | Discount %: | 03 |
| Point-Based Rate: | Total Points 09 to 13 | Discount %: | 05 |
| Point-Based Rate: | Total Points 14 to 18 | Discount %: | 08 |
| Point-Based Rate: | Total Points 19 to 25 | Discount %: | 10 |
| Point-Based Rate: | Total Points 26 to 40 | Discount %: | 15 |

Now, let's assume the following: a consumer receives a provider service on Apr. 15, 2019; the consumer is using the discount payment card at the provider for the $5^{th}$ time this year (the provider has not established any date-dependent card usage variables); the consumer year-to-date (YTD) billing using the card at the provider totals $14,500.00; the provider is functioning in an out-of-network (insurance) capacity; and the current provider billed amount is $1,500.00

In this example, the calculated point total would be as follows:

| 5 points | (Date Range: Jan. 01, 2019 to Jun. 30, 2019) + |
|---|---|
| 5 points | (Card Times Used: 01 to 99) + |
| 10 points | (Card YTD Billing: $10,000.01 to $100,000.00) + |
| 5 points | (Out-of-Network) |
| Total: | 25 points |
| Discount: | 10% (or $150.00)    (Total Points 19 to 25) |

Accordingly, in this case the system would generate an adjusted bill in the amount of $1,350.00 ($1,500.00–$150.00 discount).

Figure 11:
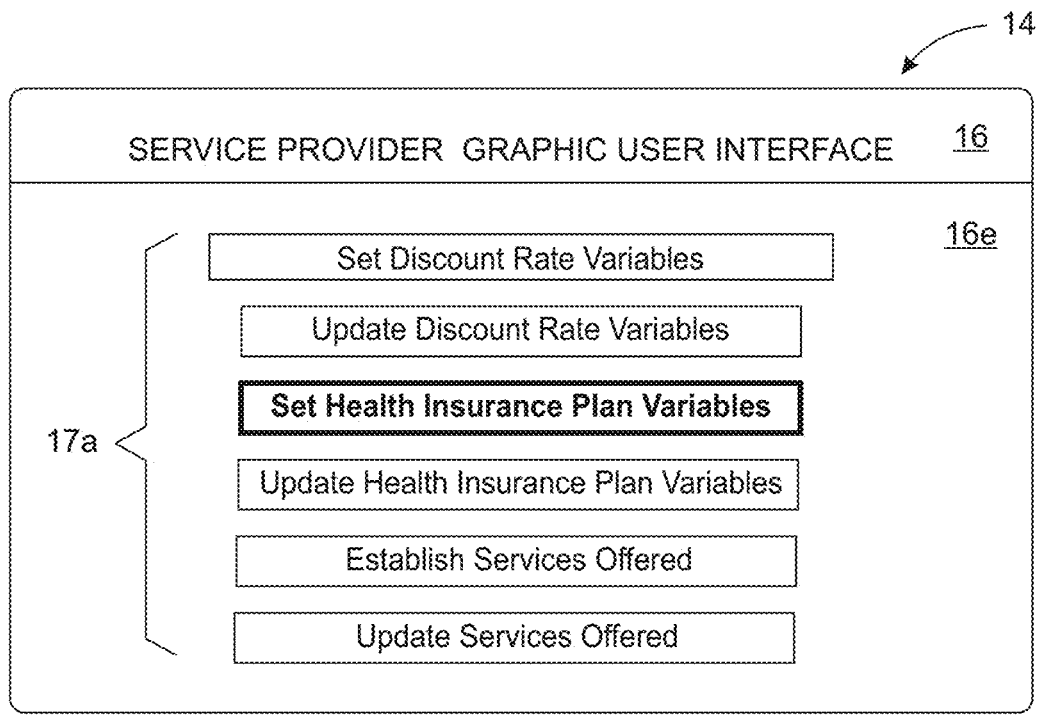
FIG. 11 is a schematic depiction of the graphical user interface (GUI) 16, originally presented in FIG. 8, of a service provider computer 14, providing a representation of a service provider screen 16a displaying general categories of information 17a established and maintained by the service provider, showing selection of the Set Health Insurance Plan Variables icon, according to some embodiments of the invention.
Figure 12:
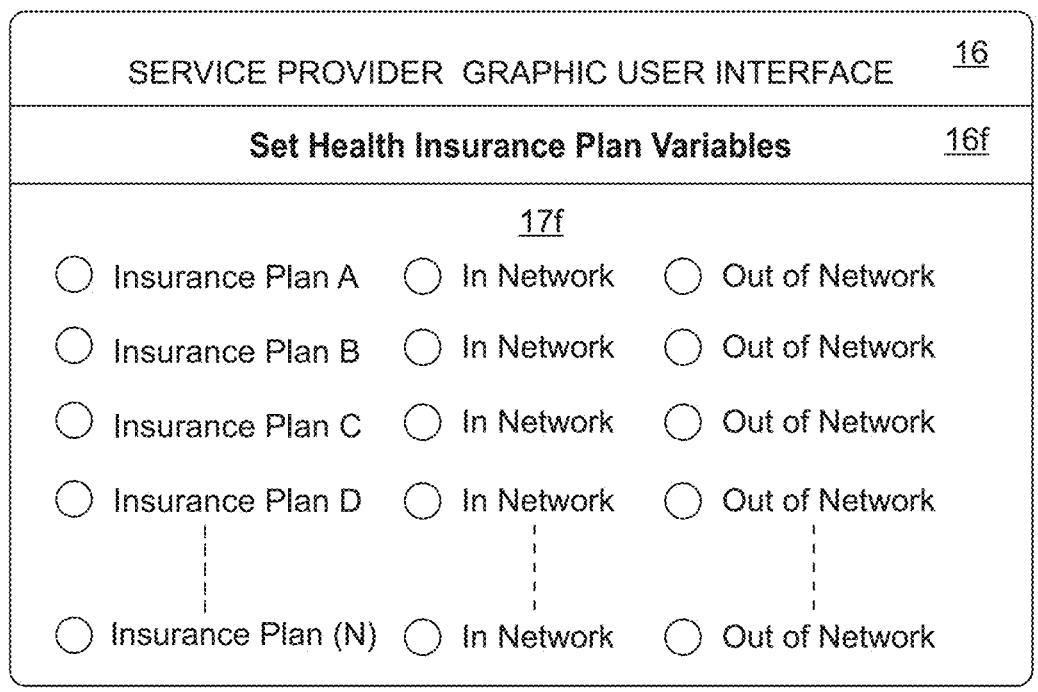
FIG. 12 is a schematic depiction of a graphical user interface (GUI) 16 of a service provider computer 14, providing a representation of a service provider screen 16f displaying an exemplary set of insurance plans associated with the discount payment card system, enabling a participating service provider to establish available insurance plans in which a health care service provider would function as an in-network provider or an out-of-network provider for insurance billing purposes, according to some embodiments of the invention.

Referring now to FIGS. 11-12, once the provider has completed entry of the discount rate variables, she may select the Set Health Insurance Plan Variables icon displayed on screen 16*e,* which automatically prompts the system to display the Set Health Insurance Plan Variables screen, which display a list of selectable Insurance Plans and corresponding selectable "In Network" and "Out of Network" identifiers, together identified by reference character 17*f.* From this page, the provider is able to select insurance plans and identify whether the provider would function in the capacity of an in-network service provider or an out-of-network service provider.

Figure 13:
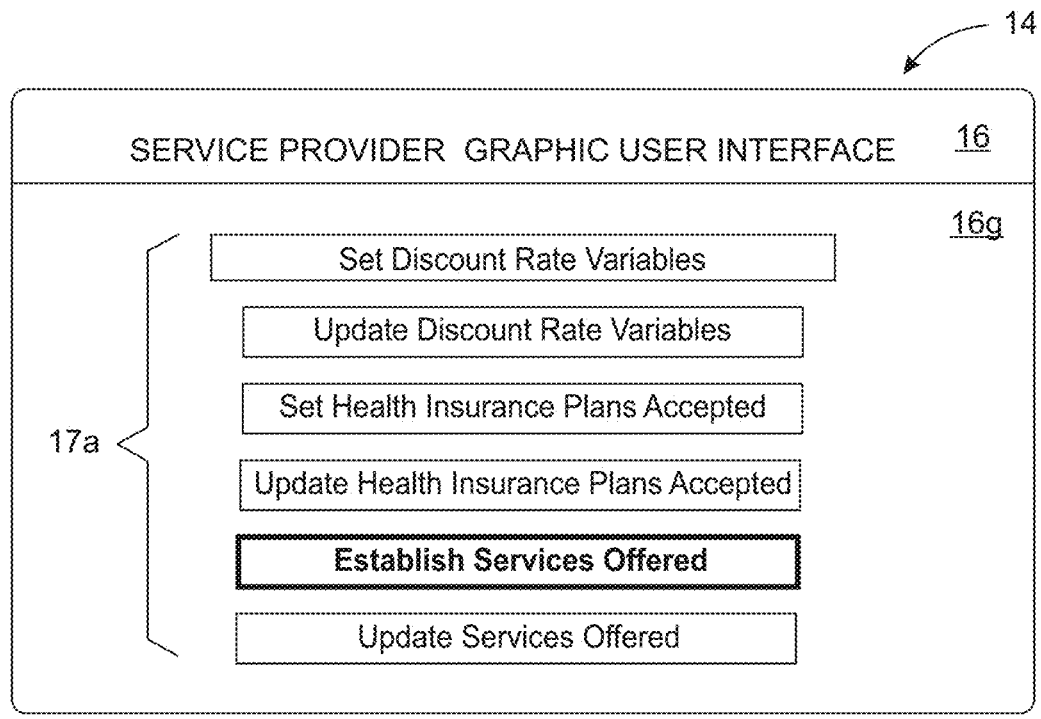
FIG. 13 is a schematic depiction of the graphical user interface (GUI) 16, originally presented in FIG. 8, of a service provider computer 14, providing a representation of a service provider screen 16g displaying general categories of information 17a established and maintained by the service provider, showing selection of the Establish Services Offered icon, according to some embodiments of the invention.
Figure 14:
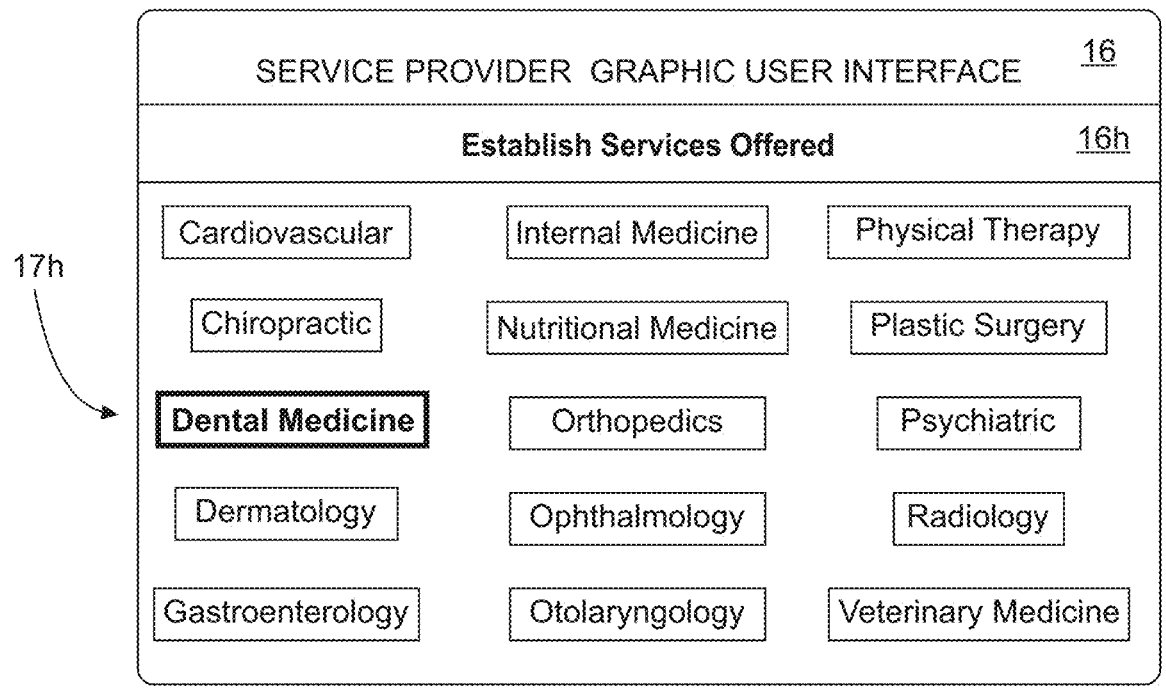
FIG. 14 is a schematic depiction of a graphical user interface (GUI) 16 of a service provider computer 14, providing a representation of a service provider screen 16h displaying an exemplary set of service provider-selectable icons 17h defining available healthcare service occupations associated with the discount payment card system, enabling a participating service provider to select a particular healthcare occupation with which the service provider services are associated, according to some embodiments of the invention.
Figure 15:
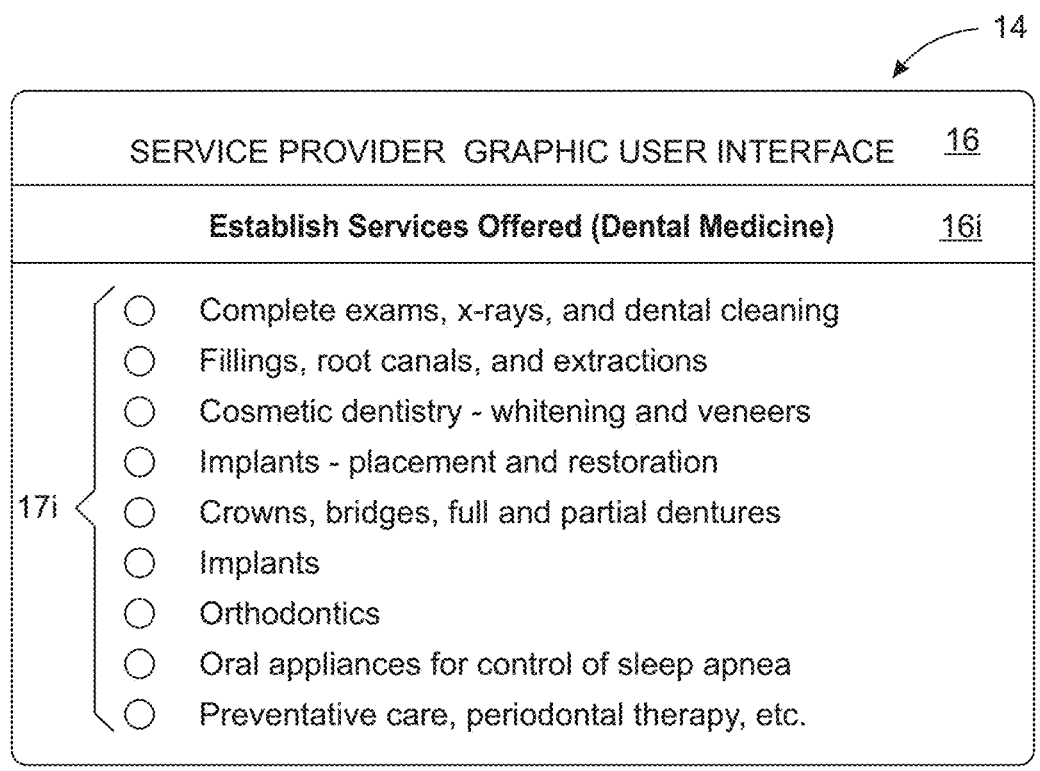
FIG. 15 is a schematic depiction of a graphical user interface (GUI) 16 of a service provider computer 14, providing a representation of a service provider screen 16i displaying an exemplary set of selectable services 17i associated with a service provider's occupation 17h (FIG. 14), enabling a participating service provider to establish a set of offered services, according to some embodiments of the invention.

Referring now to FIGS. 13-15, the provider may select the Establish Services Offered icon from the categories of information 17*a* displayed on screen 16*g* (FIG. 13). Subsequently, the system displays the Establish Services Offered screen 16*h,* which displays (in the case of the exemplary healthcare services implementation) general categories of healthcare services 17*h* from which the provider must select (FIG. 14). For instance, in this particular example, the provider has selected Dental Medicine. Accordingly, the system subsequently displays, via screen 16*i,* a list of specific services 17*i* particularly associated with the field of dental medicine (FIG. 15). The provider may then select services that the provider offers.

Either during the process of establishing the required provider data, or upon completion of the provider entry of provider data, the Service Provider Data is automatically communicated from the service provider computer 14 to system computer 51, for storage within system database 52. In some embodiments, the Service Provider Data may also be maintained on service provider database 12.

Figure 16:
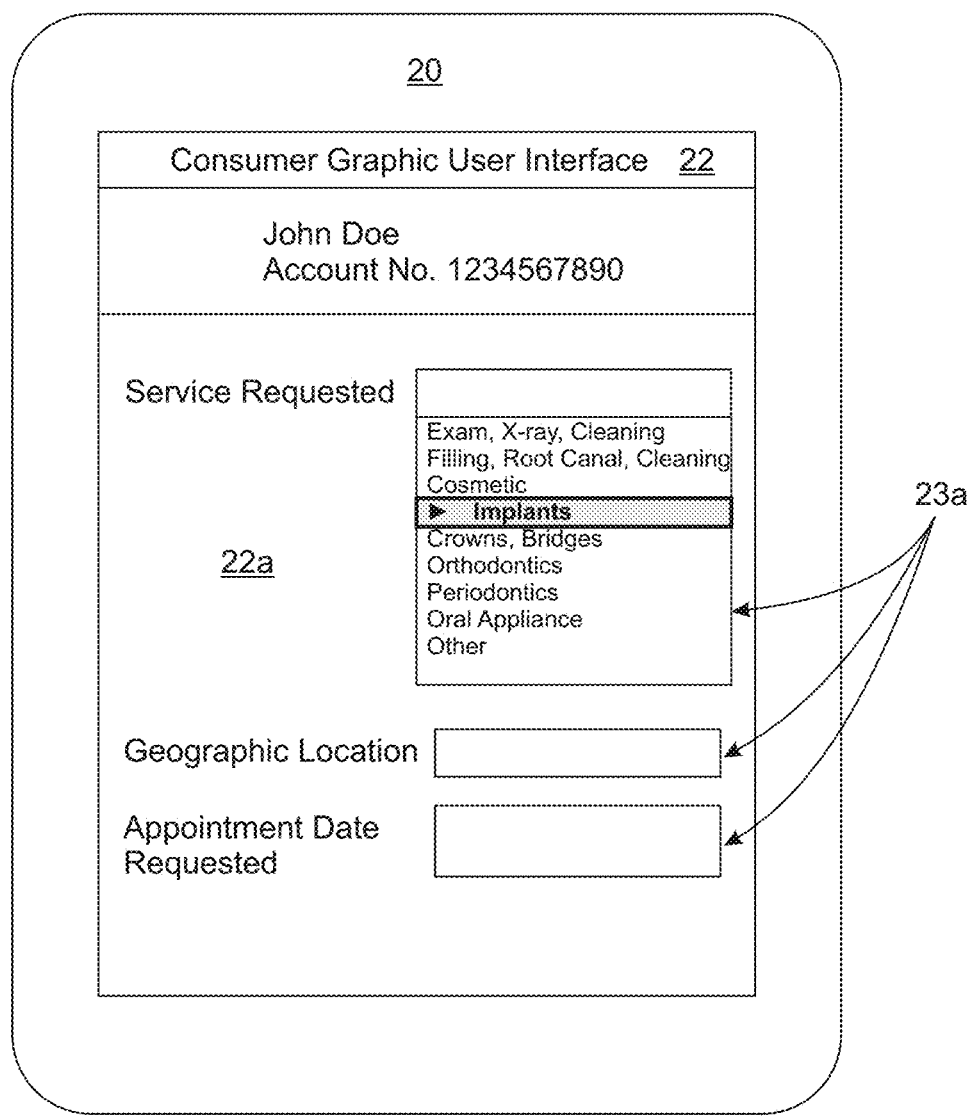
FIG. 16 is a schematic depiction of a graphical user interface (GUI) 22 displayed upon a consumer electronic smart device 20, providing a representation of a consumer-selectable service request 22a, according to some embodiments of the invention.
Figure 17:
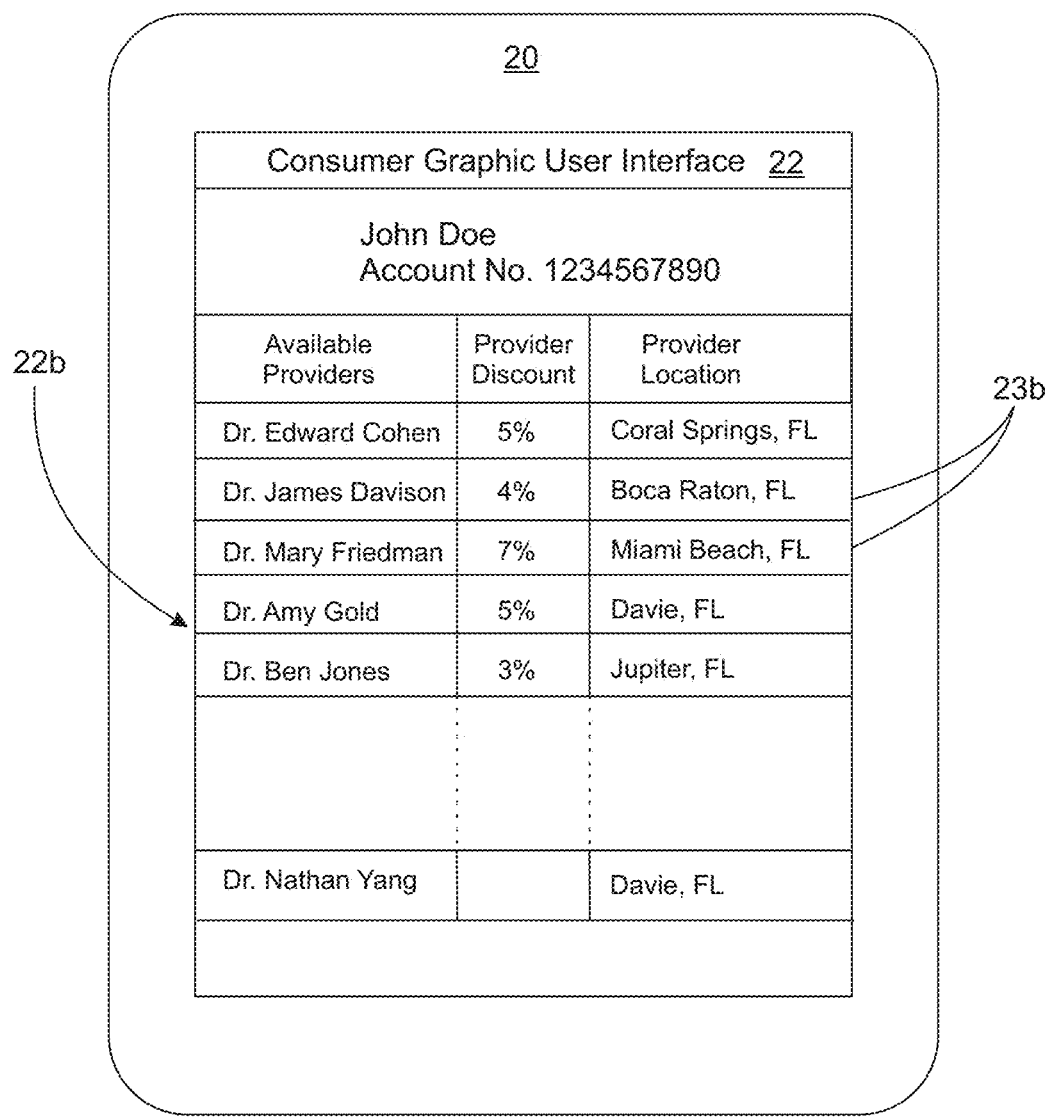
FIG. 17 is a schematic depiction of a graphical user interface (GUI) 22 displayed upon a consumer electronic smart device 20, providing a representation of a list of service providers 22b, and their respective provider discounts, who meet the criteria of the consumer-selected service request 22a (FIG. 16), according to some embodiments of the invention.

Referring now particularly to FIGS. 16-17, participating consumers interact with system 50 from consumer devices 20*a*-20*n* (more generally identified by reference character 20), via a consumer device graphic user interface (GUI) 22 displayed thereon. Initially, a potential participating consumer may sign up to participate in the discount payment card program via a consumer registration process wherein consumer data 59*b* is entered via GUI 22. In some embodiments, the consumer data may include personal contact information and consumer health insurance related information/data. During or following completion of the registration process, the consumer data is automatically communicated from the consumer device 20, via network 60, to the system computer 51—and subsequently maintained upon system database 52. Subsequent to inputting personal information and completing the consumer registration process, the consumer may use the discount card payment system to locate a provider meeting consumer-preferred criteria. In particular, once logged on to the system via a mobile software application residing on the consumer device 20 (or, alternatively, communicating with the system 50 via a system website) the consumer is queried to provide information pertaining to the scheduling of an appointment with a service provider via a series of GUI screens, such as the exemplary screens 22*a* and 22*b* shown in FIGS. 16 and 17, respectively. From mobile device display screen 22*a*, the consumer may be prompted to define a particular service requested, a preferred provide geographic location, and a preferred service appointment date (generally identified by reference character 23*a*). Upon entering the aforementioned information, a subsequent screen 22*b* displays a list or menu of available providers 23*b* meeting the consumer-established criteria. As shown in FIG. 17, the displayed list preferably includes each service provider's location and the estimated provider discount—determined by the system 50 and automatically communicated from the system computer 51 to the consumer device 20. In some embodiments of the invention, the system may further display an estimated cost (factoring in the estimated provider discount). Significantly, this information may be used by the consumer to identify a preferred service provider from the returned provider list 23*b*.

Figure 18:
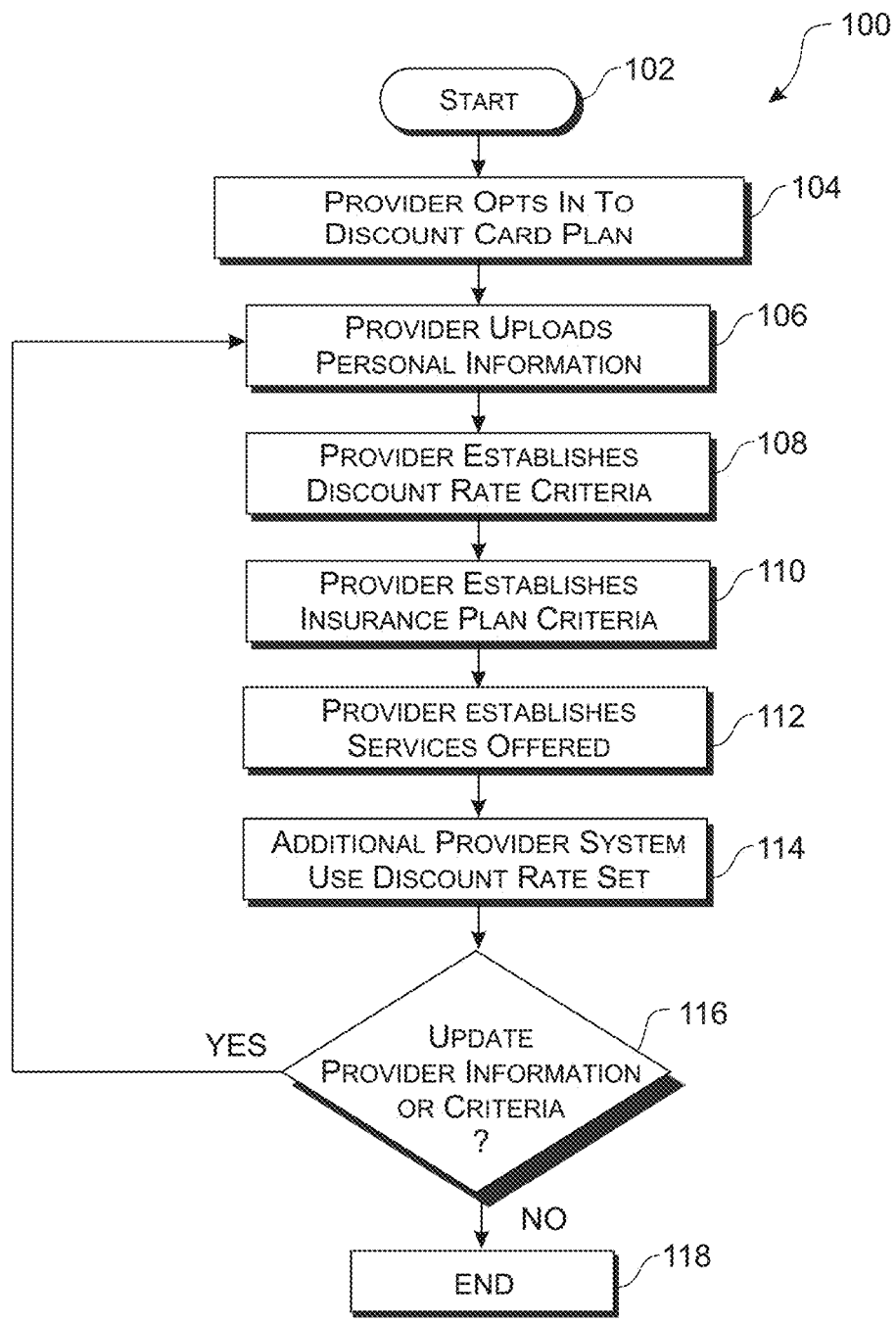
FIG. 18 is a flow chart of a service provider method of: opting into the discount payment card program, and subsequently providing personal information 106, and establishing discount rate criteria 108, insurance plan criteria 110, and offered services 112, according to some embodiments of the invention.

Turning now to FIG. 18, steps of a provider process 100 for establishing a discount payment card account is shown. As was previously described herein with reference to the screens 16*a*-16*i* displayed upon the provider GUI 16, as shown FIGS. 8-15, the service provider process begins at block 102. At block 104, the provider initiates registration with the discount payment card program via a system provider registration process. At block 106, the provider enters and uploads personal information requested by system 50. Subsequently, at block 108, the provider establishes discount rate criteria (including criteria values) that the he would like to be used as a basis for subsequent system calculations of consumer discount rates to be applied to provider bills when the consumer pays using her discount card. Subsequently, at block 110, the provider establishes insurance plan criteria (e.g. in-network vs. out-of-network provider services) to be used by the system during calculation of a discount rate to be applied to a provider-issued consumer bill. At block 112, the provider establishes a particular service area (e.g. Dental Medicine). At block 114, the provider establishes specific provider-offered services in the particular service area, as previously described. At block 116, the provider decides whether or not to update any of the established provider information or criteria. If the provider desires to update information, the process jumps back to step 106; otherwise, the process ends at block 118.

Figure 19:
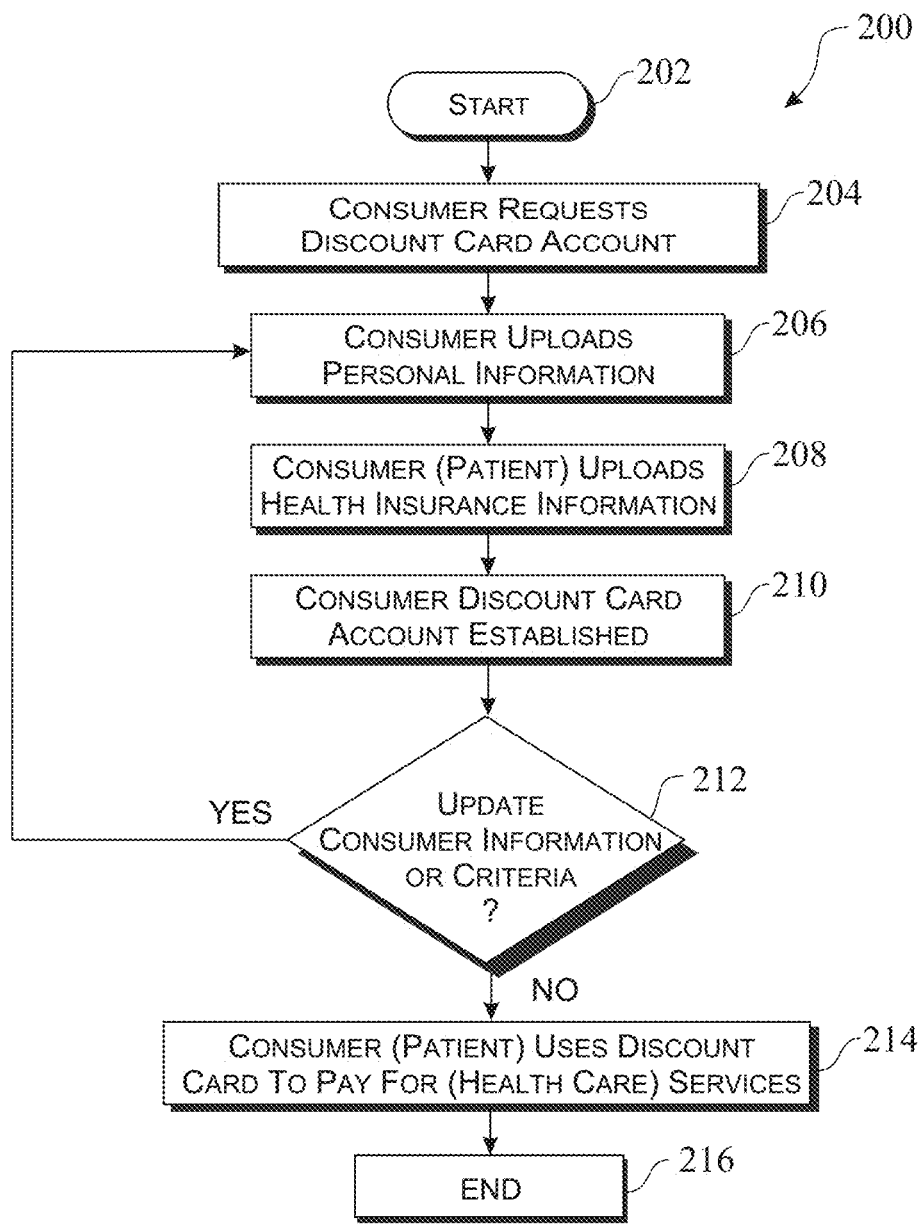
FIG. 19 is a flow chart of steps of a method of a consumer requesting a discount payment card account (including a card) 204, and subsequently providing personal information 206, health insurance information 208, in the process of establishing the discount payment card account 204, such that the consumer may use the discount payment card account (card) 204 to pay for health care services 214, in accordance with some embodiments of the invention.

Turning now to FIG. 19, steps of a consumer process 200 for establishing, and subsequently using, a discount payment card account is shown. As was previously described herein with reference to the screens 22*a*-22*b* displayed upon the provider GUI 22, as shown FIGS. 16-17, the consumer process begins at block 202. At block 204, the provider initiates registration with the discount payment card program via a system consumer registration process. At block 206, the consumer enters/uploads personal information requested by system 50. Subsequently, at block 208, the consumer may optionally be queried to input/upload health insurance-related information to be used by system 50, and the consumer health insurance-related information is subsequently communicated via wireless network/Internet 60 for download to system database 52 via system computer 51. At block 210, the consumer discount payment card account is established and ready for use by the consumer. At block 212, the consumer is queried whether or not she desires to update any previously established information or criteria. If she does, the process jumps back to step 206. Otherwise, at block 214, the consumer may use the discount payment card system to input a requested service, review a list of returned service providers meeting the consumer requested service criteria, schedule an appoint with a selected service provider and, following an appointment with the service provider, use the discount payment card to process payment of a service provider bill.

Figure 20:
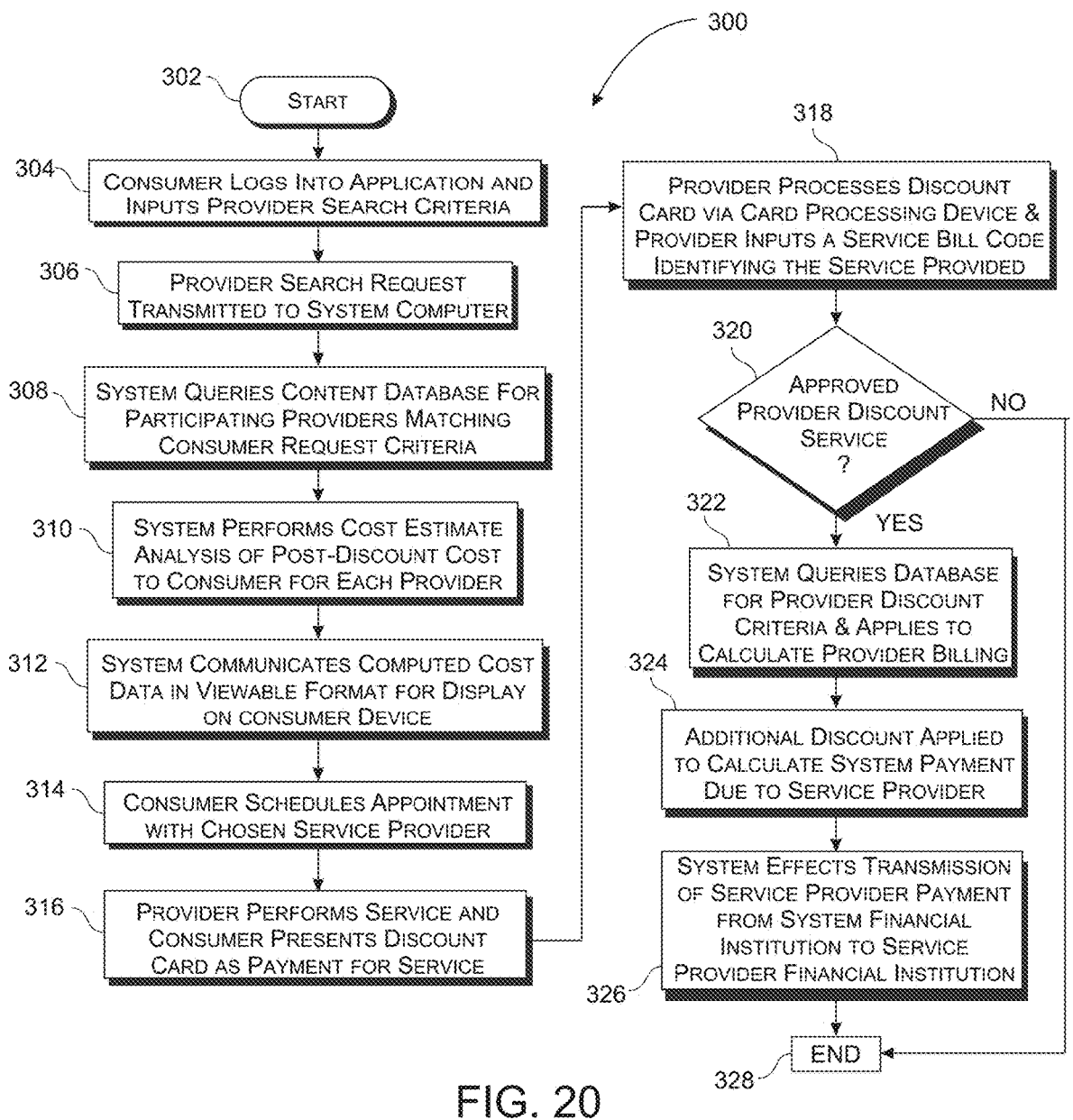
FIG. 20 is a flow chart of steps of a method of a discount payment card-holding consumer using her discount payment card to find a service provider, schedule an appointment with a selected service provider, and use her discount payment card to pay for the services provided.

Referring now to FIG. 20, a process 300 is provided illustrating the use of a participating consumer discount payment card in accordance with the discount payment card program. The process starts at block 302. Initially, at block 304, the participating consumer logs into an application residing on her mobile device 20, and subsequently enters provider service search criteria to be used by the system. Optionally, prior to entering the provider service search criteria, the consumer may elect to update previously established consumer information, etc. Subsequently, at block 306, the provider search request is communicated via wireless network/Internet 60 to system computer 51. Subsequently, at block 308, the system 50 queries system database 52 for participating service provider data, and the computer processor 53 executes a set of computer instructions to parse the initial list of participating service providers down to a subset of service providers meeting the consumer-defined provider search criteria. The system 50 then communicates this subset of matching service providers, via wireless network 60, for display upon the consumer device 20. Subsequently, at block 310, the system performs a cost estimate analysis to determine respective discount rate (and, optionally, discounted provider service cost estimates) for each of the subset of service providers. Subsequently, at block 312, the system communicates the computed cost data for display upon the consumer device 20. In this manner, the system and method of the present invention enable the consumer to conduct comparative shopping prior to selecting a particular service provider. At block 314, the consumer schedules an appointment with a chosen service provider. Subsequently, at block 316, the provider performs the requested service and the consumer presents the discount payment card for processing of a provider billed amount. At block 318, the service provider processes the discount payment card via card payment processing device 15. Significantly, in some embodiments, as part of the set of processing payment, the service provider inputs a service bill code identifying the service provided. With regard to the healthcare service industry, the bill code may be used by the system 50 to identify one or more associated medical billing codes (e.g. CPT, HCPCS codes, and ICD codes), which the system 50 may use, in conjunction with consumer insurance information, during the calculation of a discount to be applied to the service provider bill. Furthermore, in some embodiments, the system 50 may communicate directly with one or more participating consumer insurance company computers 44 in order to obtain access to current consumer insurance information (including, for example, having consumer insurance information stored in insurance company database 42 transmitted, from insurance computer 44, via network 60, to system computer 51, where the insurance information may be analyzed and/or stored in system database 52 and then analyzed). At block 320, the system may determine whether the service provided is an approved provider discounted service. If not, the process ends at block

328. If the service is an approved service for which the discount payment card may be used as a form of payment, the process proceeds to block 322 where the system queries system database 52 for provider discount criteria, and applies the provider discount criteria to calculate and apply the discount to the initial provider bill in order to generate a discounted provider bill. This is the amount that the consumer owes the service provider. However, in some embodiments, the system, at block 324, may further calculate an additional amount, i.e. an assumption-of-risk fee previously agreed upon between the system operator and the service provider, which is deducted from the discounted bill amount owed by the consumer before, at block 326, a transfer of funds is initiated from a system operator financial institution account to a service provider financial institution account. Finally, the process ends at block 328.

Significantly, the system 50 continuously or periodically monitors participating provider databases 12a-12n for any updated provider information and data. Furthermore, in some embodiments, whenever a service provider decides to modify any service provider data 59a the provider records in system database 52 are updated in real time.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

Moreover, while the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims.

What is claimed is:

1. A computer-implemented method comprising:
   (a) maintaining, by a computer system including at least one computer, a database stored in a memory, comprising:
      (1) electronic service provider data related to service providers participating in a consumer discount payment card plan, and
      (2) electronic service provider-controlled discount rate criteria data related to service provider-controlled discounts offered to discount payment card-using consumers, the service provider-controlled discount rate criteria comprising one or more of a fixed discount rate, a date range dependent discount rate, and a consumer discount card utilization dependent discount rate related to consumer discount card use for payment of prior service provider bills;
   (b) receiving, by the computer system, a request to use a consumer discount payment card associated with said consumer discount payment card plan in payment of a current service provider service;
   (c) setting, by the computer system, a non-discounted service provider bill amount associated with the current service provider service;
   (d) determining, by a service provider discount rate module of the computer system, a discount rate algorithm to apply to the non-discounted service provider bill amount, wherein the discount rate algorithm is uniquely associated with and controlled by the service provider of said current service provider service;
   (e) determining, by the discount rate module of the computer system, a discount rate to be applied to the previously set non-discounted service provider bill amount;
   (f) applying, by a billing module of the computer system, the determined discount rate to the previously set non-discounted service provider bill amount to generate a discounted service provider bill amount; and
   (g) processing, by the computer system, consumer payment of the discounted service provider bill amount using the consumer discount payment card.

2. The computer-implemented method of claim 1, further comprising steps of:
   (h) monitoring, by the computer system, for an update to the service provider-controlled discount rate algorithm generated by the service provider from a remote electronic device; and
   (i) updating, by the computer system, the discount rate module based on the service provider-controlled discount rate algorithm update.

3. The computer-implemented method of claim 1, wherein the step (b) of receiving, further comprises querying, by the computer system, the service provider discount rate module to determine whether the consumer-requested service is offered by the service provider under the consumer discount payment card plan.

4. The computer-implemented method of claim 1, wherein the consumer discount payment card utilization dependent discount rate is based on at least one of:
   (1) consumer frequency of use of said consumer discount payment card during a service provider defined prior period of time; and
   (2) consumer monetary-based use of said consumer discount payment card during a service provider defined period of time.

5. The computer-implemented method of claim 1, wherein the step (d) of determining further comprises:
   (1) enabling, by the computer system, communication between the service provider discount rate module and a graphical user interface of the service provider remote electronic device;
   (2) setting, by the service provider via the graphical user interface, preferred discount rate criteria to be used in determining the discount rate algorithm; and
   (3) applying, by the service provider discount rate module of the computer system, the preferred discount rate criteria to define a current discount rate algorithm to apply to the non-discounted service provider bill amount.

6. The computer-implemented method of claim 5, wherein:
   (1) the service provider further comprises a healthcare service provider; and
   (2) the consumer further comprises a healthcare service patient.

7. The computer-implemented method of claim 6, wherein the service provider discount rate criteria further comprise healthcare service patient insurance plan related criteria.

8. A computer-implemented method comprising:
(a) maintaining, by a computer system including at least one computer, a database stored in a memory, comprising:
(1) electronic healthcare service provider data related to healthcare service providers participating in a healthcare patient discount payment card plan,
(2) electronic healthcare service provider-controlled discount rate criteria data related to healthcare service provider discounts offered to discount card-using healthcare patients, the healthcare service provider-controlled discount rate criteria comprising one or more of a fixed discount rate, a date range dependent discount rate, a healthcare patient discount payment card utilization dependent discount rate, and a healthcare service patient insurance plan related criteria.
(b) receiving, by the computer system, a request to use a healthcare patient discount payment card associated with said healthcare patient discount payment card plan in payment of a current healthcare service;
(c) setting, by the computer system, a non-discounted healthcare service provider bill amount associated with the current healthcare service;
(d) determining, by a healthcare service provider discount rate module of the computer system, a discount rate algorithm to apply to the non-discounted service provider bill amount, wherein the discount rate algorithm is uniquely associated with and controlled by the healthcare service provider;
(e) determining, by the discount rate module of the computer system, a discount rate to be applied to the previously set non-discounted healthcare service provider bill amount;
(f) applying, by a billing module of the computer system, the determined discount rate to the previously set non-discounted service provider bill amount to generate a discounted service provider bill amount; and
(g) processing, by a billing module of the computer system, healthcare patient payment of the discounted healthcare service provider bill amount using the healthcare patient discount payment card.

9. The computer-implemented method of claim 8, wherein the healthcare service patient insurance plan related criteria further comprise:
(1) healthcare patient insurance deductible data;
(2) healthcare patient claim coverage data; and
(3) healthcare service provider accepted insurance plan data.

10. The computer-implemented method of claim 8, further comprising steps of:
(h) monitoring, by the computer system, for an update to the healthcare service provider-controlled discount rate algorithm, generated by the healthcare service provider from a remote electronic device; and
(i) updating, by the computer system, the discount rate module based on the healthcare service provider-controlled discount rate algorithm update.

11. The computer-implemented method of claim 8, wherein the step (b) of receiving, further comprises querying, by the computer system, the healthcare service provider discount rate module to determine whether the healthcare patient requested service is offered by the healthcare service provider under the healthcare patient discount payment card plan.

12. The computer-implemented method of claim 8, wherein the healthcare patient discount payment card utilization dependent discount rate is based on at least one of:
(1) healthcare patient frequency of use of said healthcare patient discount payment card during a healthcare service provider defined prior period of time; and
(2) healthcare patient monetary-based use of said healthcare patient discount payment card during a healthcare service provider defined period of time.

13. The computer-implemented method of claim 8, wherein the step (d) of determining further comprises:
(1) enabling, by the computer system, communication between the healthcare service provider discount rate module and a graphical user interface of the healthcare service provider remote electronic device;
(2) setting, by the healthcare service provider via the graphical user interface, preferred discount rate criteria to be used in determining the discount rate algorithm; and
(3) applying, by the healthcare service provider discount rate module of the computer system, the preferred discount rate criteria to define a current discount rate algorithm to apply to the non-discounted healthcare service provider bill amount.

14. The computer-implemented method of claim 13, wherein the step (d)(2) of setting preferred discount rate criteria by the healthcare service provider via the graphical user interface further comprises establishing, for each individual criterion of said discount rate criteria, a predetermined weight based upon varying degrees of importance of each individual criterion to the healthcare service provider.

* * * * *